(12) United States Patent
Sugisawa (10) Patent No.: US 9,176,709 B2
(45) Date of Patent: Nov. 3, 2015

(54) SHARED INTEGER, FLOATING POINT, POLYNOMIAL, AND VECTOR MULTIPLIER

(75) Inventor: Junji Sugisawa, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 932 days.

(21) Appl. No.: 13/306,460

(22) Filed: Nov. 29, 2011

(65) Prior Publication Data

US 2013/0138711 A1    May 30, 2013

(51) Int. Cl.
*G06F 7/533*    (2006.01)
*G06F 7/72*    (2006.01)

(52) U.S. Cl.
CPC .............. *G06F 7/5338* (2013.01); *G06F 7/722* (2013.01); *G06F 7/724* (2013.01); *G06F 2207/3812* (2013.01)

(58) Field of Classification Search
USPC ........................... 708/492, 620, 625, 628–630
See application file for complete search history.

(56) References Cited

U.S. PATENT DOCUMENTS

| | | | | |
|---|---|---|---|---|
| 5,764,558 | A * | 6/1998 | Pearson et al. | 708/625 |
| 5,999,959 | A * | 12/1999 | Weng et al. | 708/492 |
| 7,139,787 | B2 | 11/2006 | Rarick et al. | |
| 7,313,583 | B2 * | 12/2007 | Porten et al. | 708/492 |
| 7,373,368 | B1 * | 5/2008 | Rarick et al. | 708/492 |
| 7,447,726 | B2 * | 11/2008 | Kershaw et al. | 708/625 |
| 7,599,981 | B2 | 10/2009 | Ekner et al. | |
| 8,271,570 | B2 * | 9/2012 | Gopal et al. | 708/492 |
| 8,645,448 | B2 * | 2/2014 | Elliott | 708/492 |
| 2006/0004903 | A1 * | 1/2006 | Admon | 708/708 |
| 2012/0143934 | A1 * | 6/2012 | Elliott | 708/209 |

OTHER PUBLICATIONS

J. Grobschadl and G.-A. Kamendje, "Low-power design of a functional unit for arithmetic in finite fields gf(p) and gf(2m)", WISA 2003, Lecture Notes in Computer Science vol. 2908, pp. 227-243, 2004.*
Grobschadl, J., "A unified radix-4 partial product generator for integers and binary polynomials", In: Proceedings of the 35th IEEE International Symposium on Circuits and Systems (ISCAS 2002), vol. III, pp. 567-570, May 2002.*
Johann Grobschadl "A Unified Radix-4 Partial Product Generator for Integers and Binary Polynomials" pp. 567-570.

* cited by examiner

*Primary Examiner* — Chuong D Ngo
*Assistant Examiner* — Matthew Sandifer
(74) *Attorney, Agent, or Firm* — Rory D. Rankin; Meyertons, Hood, Kivlin, Kowert & Goetzel, P.C.

(57) ABSTRACT

A multiplier for performing multiple types of multiplication including integer, floating point, vector, and polynomial multiplication. The multiplier includes a modified booth encoder within the multiplier and unified circuitry to perform the various types of multiplication. A carry save adder tree is modified to route sum outputs to one part of the tree and to route carry outputs to another part of the tree. The carry save adder tree is also organized into multiple carry save adder trees to perform vector multiplication.

24 Claims, 8 Drawing Sheets

| Bits | | | Regular | Polynomial |
|---|---|---|---|---|
| 2 | 1 | 0 | | |
| 0 | 0 | 0 | 0X | 0X |
| 0 | 0 | 1 | 1X | 0X |
| 0 | 1 | 0 | 1X | 1X |
| 0 | 1 | 1 | 2X | 1X |
| 1 | 0 | 0 | -2X | 2X |
| 1 | 0 | 1 | -1X | 2X |
| 1 | 1 | 0 | -1X | 3X |
| 1 | 1 | 1 | 0X | 3X |

Four 8-Bit Multiply Operations

FIG. 5A

Two 16-Bit Multiply Operations

FIG. 5B

One 32-Bit Multiply Operation

SHARED INTEGER, FLOATING POINT, POLYNOMIAL, AND VECTOR MULTIPLIER

BACKGROUND

1. Field of the Invention

The present invention relates generally to multipliers, and in particular to methods and mechanisms for performing numerous types of multiplication with the same multiplier circuitry.

2. Description of the Related Art

Modern-day processors often need to perform several different types of multiplication (e.g., integer, floating point, vector, polynomial). The multipliers used by processors are typically large, resource intensive circuits. Implementing numerous separate multipliers to perform each type of multiplication can consume a large amount of die space. Die space on a processor is limited in availability and typically there is only so much die space on the processor available for multiplier circuits. The less space taken up by the multipliers, the more space is available for other circuits, and therefore the number and size of the multipliers should be reduced as much as possible.

SUMMARY

In one embodiment, a shared multiplier may be configured to perform several different types of multiply operations on input operands. For example, the multiplier may perform integer, floating point, and polynomial multiply operations. Additionally, the shared multiplier may perform scalar and vector multiply operations. The multiplier may be configured to perform any of these multiply operations on a given clock cycle depending on the operating mode of the multiplier. The multiplier may also be configured to perform multiply operations on input operands of with any of various bit-lengths, and the bit-lengths may vary from operation to operation.

In one embodiment, the multiplier may be utilized to calculate a product of a multiplier operand and a multiplicand operand. The multiplier may include a plurality of encoders and multiplexers. The encoders may generate encoder output values which may be coupled to the multiplexers to select partial products generated from the multiplicand operand. Each encoder may be configured to generate an encoder output value based on two adjacent bits of the multiplier operand, such as when performing a polynomial multiply operation. Each encoder may also be configured to generate an encoder output value based on three adjacent bits of the multiplier operand, such as when performing an integer or floating point multiply operation.

The encoder output values may be coupled to a plurality of multiplexers. Each multiplexer may select from a plurality of partial products, and the selection may be based on a respective encoder output value. The partial products may be generated from the multiplicand operand and may represent various multiples (e.g., 1×, −1×, 2×, −2×, polynomial 3×, 0) of the multiplicand operand. The selected partial products may be received by an adder tree, and the adder tree may reduce the partial products on successive levels of the adder tree. The adder tree may include a plurality of carry save adders (CSAs) arranged into a plurality of levels. The adder tree may be configured to route carry terms to a first portion of CSAs and to route sum terms to a second portion of CSAs.

A first output may be generated from the first and second portions of CSAs, and in one embodiment, the first output may be an integer product. Alternatively, if the input operands are floating point operands, then the first output may be a floating point product. A second output may be generated from the second portion of CSAs. In one embodiment, the second output may be a polynomial product.

In other embodiments, various methods for performing multiplication may be implemented. One method may include generating a sum term and a carry term in each CSA of three top-level CSAs of an adder tree. The three carry terms may be conveyed to a first middle-level CSA and the three sum terms may be conveyed to a second middle-level CSA. A sum term may be generated from the second middle-level CSA and this sum term may be a polynomial product of the input operands. The sum and carry terms of the middle-level CSAs may be conveyed to a bottom-level CSA, and the sum and carry terms of the bottom-level CSA may be generated and added to form an integer or floating point product of the input operands.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A processor comprising a cache . . . " Such a claim does not foreclose the processor from including additional components (e.g., a network interface, a crossbar).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical) unless explicitly defined as such. For example, in an adder tree with six CSAs, the terms "first" and "second" CSAs can be used to refer to any two of the six CSAs.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 1:
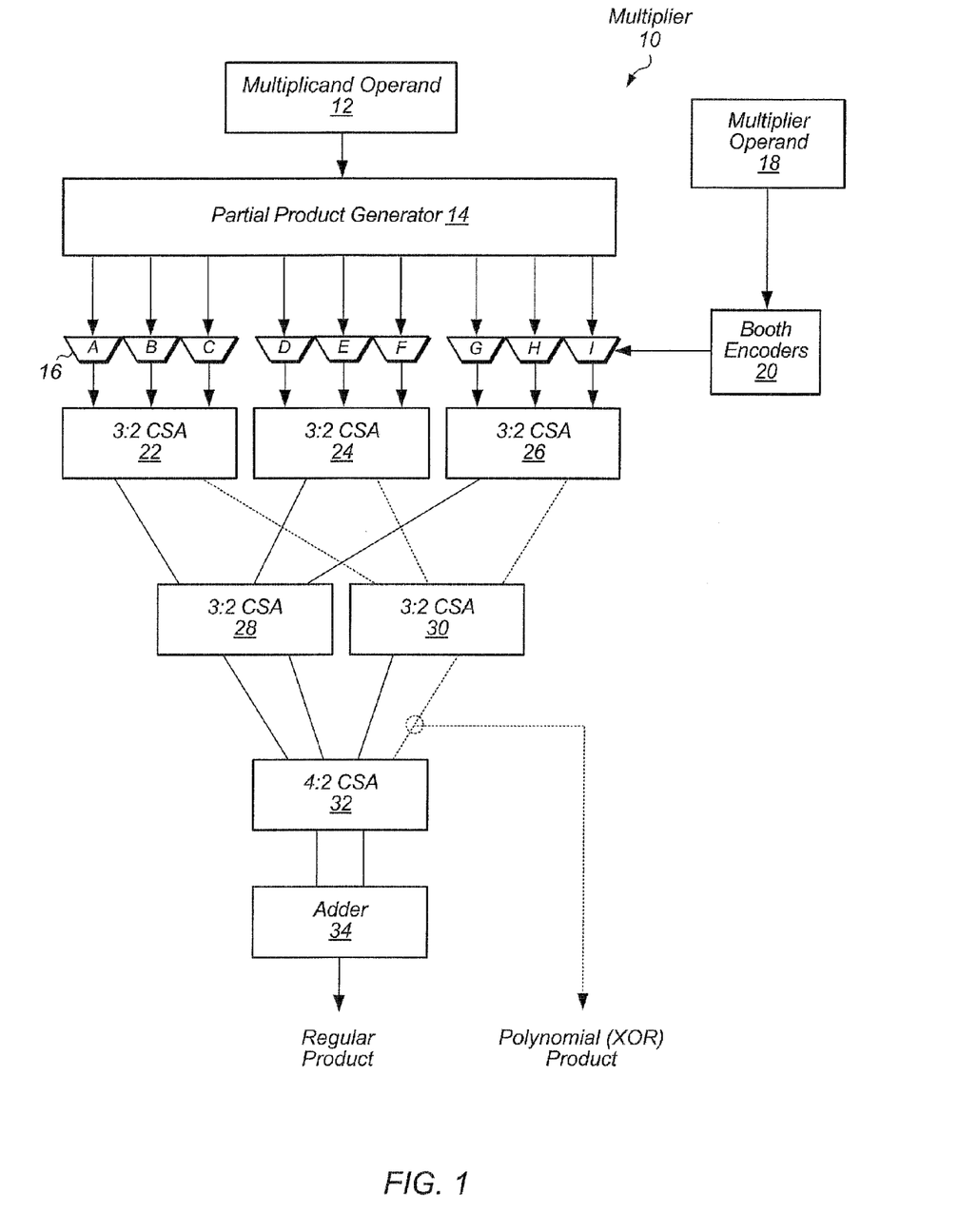
FIG. 1 is a block diagram that illustrates one embodiment of a multi-purpose multiplier.

Referring now to FIG. 1, a block diagram illustrating one embodiment of a multi-purpose multiplier is shown. In various embodiments, multiplier 10 may be incorporated within one or more execution units within a processor, and the processor may be included within a system on chip (SoC), an application specific integrated circuit (ASIC), or any of various other similar devices. Also, there may be more than one processor incorporated within a SoC. Multiplier 10 shown in FIG. 1 may also be combined with other similar multipliers to create a larger multiplier to multiply larger bit-width operands.

Multiplier 10 may include selection logic that is configured to select multiplier operand 18 and multiplicand operand 12 from among a plurality of different potential sources. Typically, one of the two operands in the multiplication operation will be defined as the multiplicand operand and the other operand will be defined as the multiplier operand, though the assignment may be swapped. The potential sources of multiplier 10 may include one or more of the following: an integer operand, a packed integer operand, a floating point operand, a packed floating point operand, a polynomial operand, a packed polynomial operand, or the result of a previous iterative multiplication instruction. Multiplier 10 may also operate on signed or unsigned input operands and may perform any of various types of multiplication (e.g., integer, floating point, polynomial, scalar, vector). Furthermore, multiplier 10 may be implemented in a pipelined fashion to allow for new multiplicand and multiplier operands to be received on each clock cycle.

Multiplicand operand 12 may be coupled to partial product generator 14, and partial product generator 14 may generate several partial products based on multiplicand operand 12. For example, generator 14 may generate shifted and/or negated values of operand 12, such as −1×, 2×, −2×, and polynomial 3×. The "polynomial 3×" term may be more succinctly referred to herein as a "3×" term, which is not to be confused with a traditional 3× multiplication term. These partial products, along with the original multiplicand operand (1×) and a 0 term, may be coupled to multiplexers 16A-I.

Multiplier operand 18 may be coupled to booth encoders 20, and booth encoders 20 may generate encoder output values based on the bits of operand 18. In one embodiment, when multiplier 10 is operating in integer or floating point multiplication mode, booth encoders 20 may generate encoder output values based on groups of three adjacent bits of operand 18. The lowest bit of the three adjacent bits may overlap with the highest bit of the next group of three adjacent bits of operand 18. In another embodiment, when multiplier 10 is in polynomial multiplication mode, booth encoders 20 may generate encoder output values based on two adjacent bits of operand 18. The outputs from booth encoders 20 may be conveyed to multiplexers 16A-I to select the corresponding partial products. Each multiplexer 16A-I is representative of any number of multiplexers that may be used to select a partial product from the multiplicand operand based on the booth encoding of the relevant bits of the multiplier operand.

Multiplexers 16A-I may be configured to select partial products based on the encoding values received from booth encoders 20. The selected partial products are then routed to the top level of the adder tree. The top level includes 3:2 carry save adders (CSAs) 22, 24, and 26. A 3:2 CSA, also referred to as a full adder, is configured to generate sum and carry outputs from three inputs. The sum and carry outputs may also be referred to as sum and carry terms. The three inputs may be referred to as A, B, and C, and the sum output may be calculated as: sum=A XOR B XOR C. The carry output may be calculated as: carry=(A AND B) OR (B AND C) OR (A AND C). The 3:2 CSA may be implemented in any suitable fashion to calculate the sum and carry outputs. 4:2 CSA 32 may perform similar calculations as 3:2 CSAs 22-30 except with four inputs instead of three. 4:2 CSA 32, like each of 3:2 CSAs 22-30, may also generate a sum output and a carry output from its respective inputs. In various embodiments, the inputs and outputs of CSAs 22-32 may be any of various bit-lengths. For example, in one embodiment, the inputs and outputs of CSAs 22-32 may be 32-bits long.

The solid line outputs from CSAs 22, 24, and 26 are the carry outputs, and these carry outputs may be coupled to CSA 28. The dotted line outputs from CSAs 22, 24, and 26 are the sum outputs, and these sum outputs may be coupled to CSA 30. A polynomial product may only be based on the sum outputs generated from adding the partial products. Therefore, by configuring the adder tree of multiplier 10 such that the sum outputs are not added together with any of the carry outputs, the polynomial product of multiplicand operand 12 and multiplier operand 18 may be generated by not including any of the propagated carry outputs.

The sum output (dotted line) of CSA 30 may be coupled to an output of multiplier 10 as the polynomial product output of the multiplication operation. Both carry and sum outputs of CSAs 28 and 30 may be coupled as inputs to 4:2 CSA 32. The outputs of CSA 32 may be added by adder 34 and then the output of adder 34 may be the regular product. The regular product may be the result of an integer or floating point multiplication operation.

In one embodiment, the multiplicand and multiplier operands may be 8-bit values, and multiplier 10 may perform 8-bit polynomial multiplication. In another embodiment, multiplier 10 may perform 8-bit integer or floating point multiplication. In a further embodiment, the multiplicand and multiplier operands may be 16-bit values, and multiplier 10 may perform 16-bit polynomial multiplication. In a still further embodiment, multiplier 10 may perform 16-bit integer or floating point multiplication. In one embodiment, multiplier 10 may switch between each of these modes and perform operations on an as-needed basis as requested by the host processor.

In other embodiments, multiplier 10 may be implemented by replacing one or more of the 3:2 CSAs with half-adders (i.e., 2:2 CSAs), depending on the bit-width of multiplicand operand 12 and multiplier operand 18. Also, in other embodiments, other multipliers may be implemented with other numbers of levels and CSAs to perform multiplication operations of other bit-sizes. In these other embodiments, the adder tree utilized with multiplier 10 may include more than three levels, more than six CSAs, and/or other sizes of CSAs (e.g., 5:2, 6:2). Adder trees with any number of levels may be utilized, and the structure shown in FIG. 1 may be replicated for these larger adder trees. For larger adder trees, the sum outputs of upper levels may be routed to a first portion of CSAs on the lower levels, and the carry outputs of upper levels may be routed to a second portion of CSAs. The sum and carry outputs may be kept separate within the adder tree, such that a polynomial output may be generated separately from the carry outputs that propagate through the adder tree.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

Figure 2:
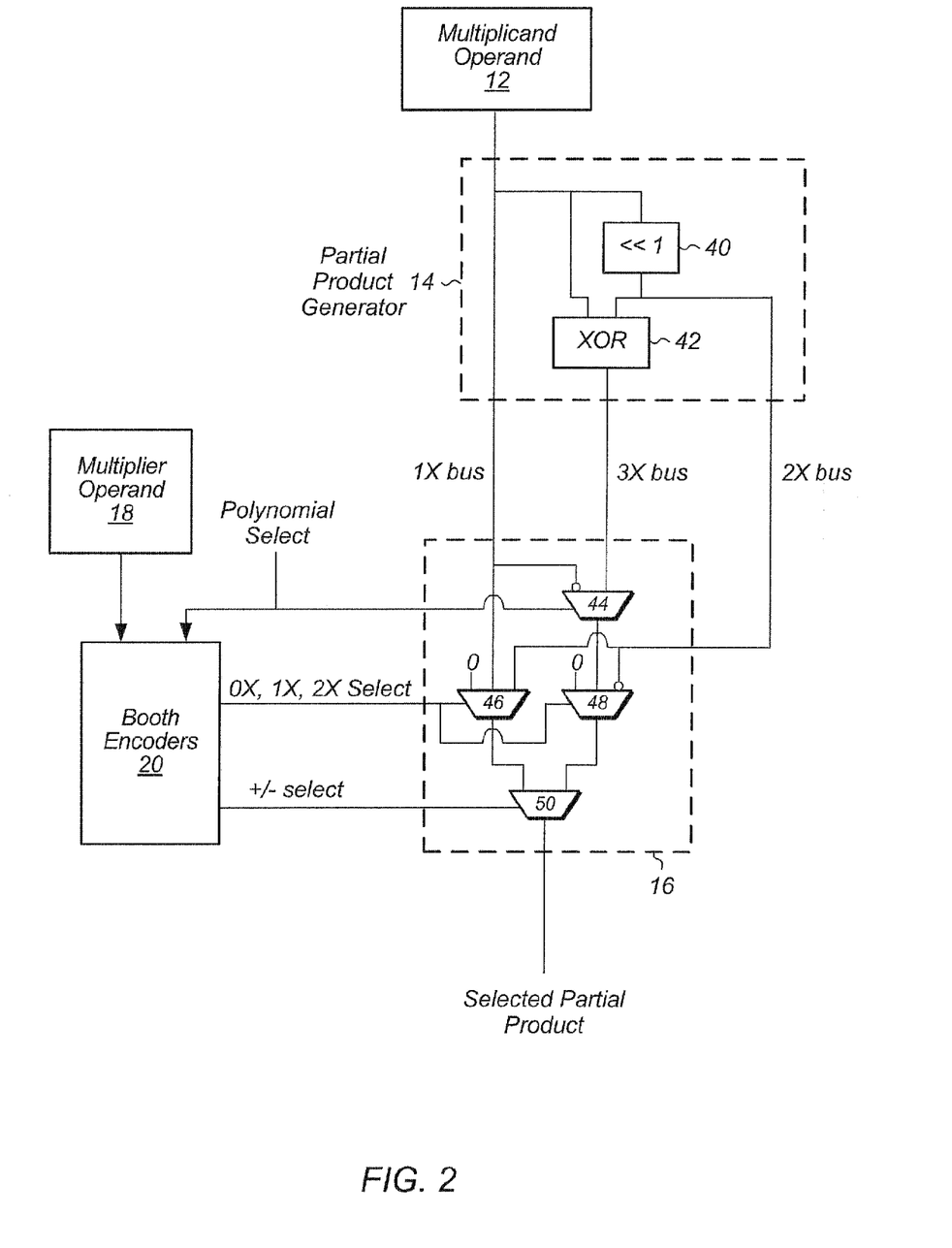
FIG. 2 is the input portion of a multiplier in accordance with one or more embodiments.

Turning now to FIG. 2, one embodiment of the input portion of a multiplier is shown. Multiplicand operand 12 may be coupled to various circuit elements, including shifter 40, XOR gate 42, and multiplexers 44 and 46. Shifter 40 may shift the bits of operand 12 one bit to the left, effectively doubling the value of operand 12. The shifted version of the multiplicand may be coupled to an input of XOR gate 42, and the other input to XOR gate 42 may be the original version of multiplicand operand 12. The output of XOR gate 42 may be the +3× term of the multiplicand, which may be utilized for polynomial multiplication.

The inputs to multiplexers 44-48 include various shifted and inverted versions of multiplicand operand 12, such as the multiplicand multiplied by various factors −1×, −2×, +2×, and +3×. The inputs to multiplexers 44-48 also include the original multiplicand value (+1×) and 0. In one embodiment, each of the multiplexers 16A-I of FIG. 1 may be implemented with the four multiplexers 44-50 as shown in FIG. 2. The +1× bus of the multiplicand is inverted at one of the inputs of multiplexer 44, and the other input to multiplexer 44 is the +3× bus of the multiplicand. The polynomial select line may select between the −1× term and the +3× term, and the polynomial select line may also be coupled to booth encoders 20. Multiplexer 46 may select between 0, +1×, and +2× of the multiplicand. Multiplexer 48 may select between 0, −1× (3×), and −2× of the multiplicand. Multiplexer 50 may select between the positive and negative partial products.

For polynomial multiplication, the sign select for multiplexer 50 may be forced to zero to make the multiplexer select the +2× term instead of the −2× term. In another embodiment, the −1× term of multiplicand operand 12 may be generated on a separate bus rather than inverting the +1× term of multiplicand operand 12. The separate −1× bus may drive the polynomial +3× term during polynomial multiplication.

Figure 3:
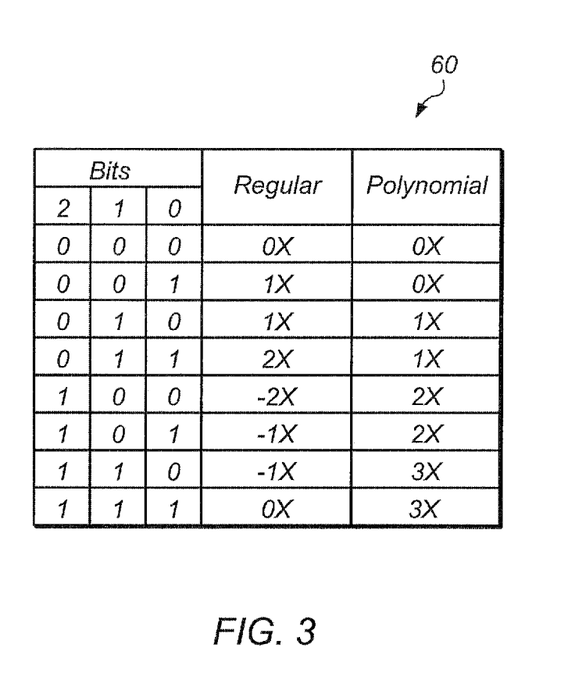
FIG. 3 is a truth table for a modified booth encoder in accordance with one or more embodiments.

Referring now to FIG. 3, a truth table for a modified booth encoder in accordance with one or more embodiments is shown. Encoder table 60 shows the encoder output values which may be generated by a booth encoder, such as booth encoders 20 of FIG. 1. Bits 2-0 are shown in table 60, and these bits are representative of adjacent bits from a multiplier operand. An encoder may receive a multiplier operand and generate values shown in the "Regular" column when the multiplier circuit is in a first mode and generate values shown in the "Polynomial" column when the multiplier circuit is in a second mode. Regular multiplication (e.g., integer multiplication, floating point multiplication) may utilize three bits (bits 2, 1, and 0) to determine the corresponding booth encoding. Polynomial multiplication may utilize two bits (bits 2 and 1) to determine the corresponding booth encoding.

The encoder may determine the value based on each group of three adjacent bits of the multiplier operand when in the first mode. The first mode may be utilized for performing an integer or floating point multiplication operation. A lowest bit of the three adjacent bits may overlap with the highest bit of the next three adjacent bits of the multiplier operand. When in the second mode, for performing a polynomial multiplication operation, the encoder may utilize groups of two adjacent bits of the multiplier, effectively ignoring the third bit column (Bit 0) when generating the corresponding encoder output value. The various terms of the multiplicand operand (0×, 1×, 2×, −1× (3×), −2×) may be coupled to the inputs of one or more multiplexers, and the encoder output values generated by the booth encoders may select from these multiplicand terms. In one embodiment, to use the same booth encoders for both polynomial and regular multiplication operations, the booth encoders may force Bit 0 to "0" for polynomial multiplication. This may minimize the delay involved in performing booth encoding for polynomial multiplication mode.

Figure 4:
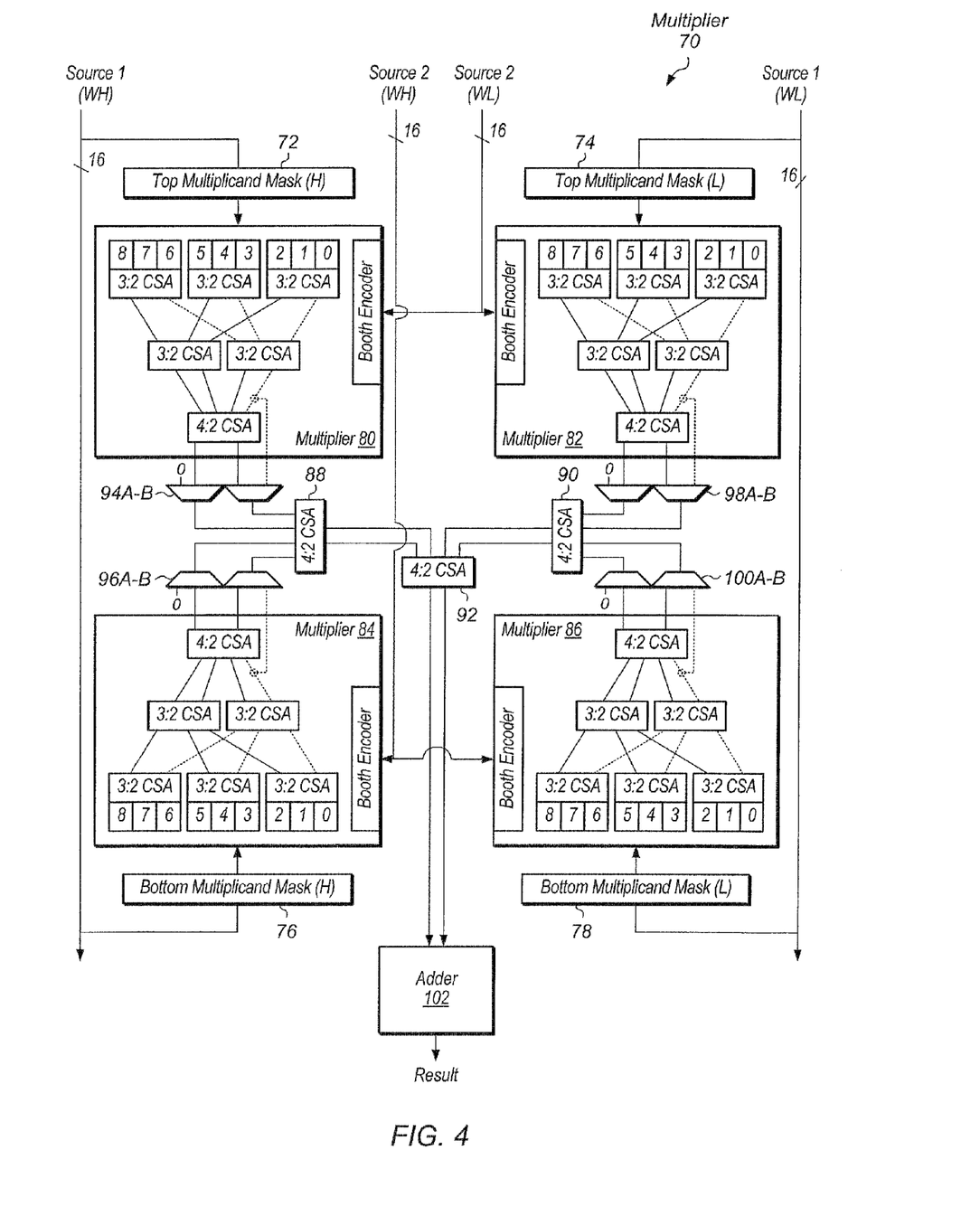
FIG. 4 is a block diagram that illustrates a 32-bit by 32-bit multiplier in accordance with one or more embodiments.

Turning now to FIG. 4, a block diagram of one embodiment of a 32-bit by 32-bit multiplier is shown. Multiplier 70 includes four instances of 16-bit by 16-bit multipliers. These four instances include multipliers 80, 82, 84, and 86. Each multiplier 80-86 may perform a 16-bit by 16-bit multiply. Each multiplier may include a carry save adder (CSA) tree as shown in FIG. 1. The carry outputs of the first level of CSAs may be coupled to the inputs of a first CSA on the second level of CSA tree. The sum outputs of the first level of CSAs may be coupled to the inputs of a second CSA on the second level of CSA tree. The sum outputs of the first level of CSAs are kept separate from the carry outputs of the first level of CSAs. In this way, the CSA tree may be able to generate both a product of polynomial multiplication and a product of integer or floating point multiplication. The sum output of the second CSA on the second level may be coupled to the third level CSA and may also be coupled to an output multiplexer.

The inputs to multiplier 70 may be a multiplicand operand (source 1) and a multiplier operand (source 2). The upper 16 bits, or word high (WH), of source 1 may be coupled to masks 72 and 76. The lower 16 bits, or word low (WL), of source 1 may be coupled to masks 74 and 78. Masks 72-78 may couple portions of the received operands to the corresponding multiplier and may mask other portions to zero depending on the type of multiply being performed and the bit-width of the operands being multiplied.

Each multiplier 80-86 is coupled to a corresponding pair of multiplexers 94-100. For example, multiplier 80 is coupled to multiplexers 94A-B. In particular, the sum output of the second CSA on the second level of multiplier 80 is coupled to multiplexer 94B, the sum output of the third-level CSA is coupled to multiplexer 94B, the carry output of the third-level CSA is coupled to multiplexer 94A, and a zero input is coupled to multiplexer 94A. The multiplexer 94A may include other circuitry for manipulating data, masking certain bits, and/or shifting received data. Depending on the type of operation being performed, multiplexer 94A may realign the data received from the 4:2 CSA before passing the data to 4:2 CSA 88. Multiplexers 96A, 98A, and 100A may be configured to operate in a similar fashion.

The select lines coupled to multiplexers 94-100 may be based on the operating mode of multiplier 70. In various embodiments, the operating modes of multiplier 70 may include a first mode for regular multiplication (e.g., integer, floating point) and a second mode for polynomial multiplication. If host multiplier 70 is performing a regular multiply operation, the select line to multiplexer 94A may select the carry output from the bottom-level 4:2 CSA of multiplier 80, and the select line to multiplexer 94B may select the sum output from the bottom-level 4:2 CSA of multiplier 80. If multiplier 70 is performing a polynomial multiply operation, the select line to multiplexer 94A may select the zero input, and the select line to multiplexer 94B may select the sum output from the second middle-level 3:2 CSA of multiplier 80.

The outputs of multiplexers 94-100 are coupled to a final adder tree, and the final adder tree includes 4:2 CSAs 88, 90, and 92 and adder 102. In one embodiment, the final adder tree may generate a single final result by combining the sum and carry outputs of multipliers 80-86. The final result may represent a product of the multiplicand operand (source 1) and the multiplier operand (source 2). In another embodiment, the final adder tree may generate four separate sum outputs when multiplier 70 is performing a first vector multiply operation of four 8-bit by 8-bit input values. In a further embodiment, the final adder tree may generate two separate sum outputs when multiplier 70 is performing a second vector multiply operation of two 16-bit by 16-bit input values.

In various embodiments, multiplier 70 may perform various different types of multiplication operations, such as floating point, integer, and polynomial, as well as vector or scalar operations of each of these types of multiplications. For example, in one embodiment, multiplier 70 may perform a vector polynomial multiply operation. Each of the input operands may consist of four 8-bit values, and a polynomial multiply operation may be performed on the four separate pairs of 8-bit operands. The result may be a vector polynomial product, which may consist of four separate 16-bit polynomial products packed into a single 64-bit output operand.

It is noted that the 32-bit by 32-bit size of multiplier 70 is representative of one possible embodiment. In other embodiments, multiplier 70 may be any of various other sizes or may be part of larger multipliers. For example, in another embodiment, multiplier 70 may be part of a 64-bit by 64-bit multiplier, which may include four instances of multiplier 70. Other multiplier circuits may include various numbers of instances of multiplier 70 to form other sizes of multipliers. In another example, eight instances of multiplier 70 may be utilized to perform vector multiplication of eight separate 32-bit by 32-bit multiply operations. Other variations of multipliers that include two or more instances of multiplier 70 are possible and are contemplated.

Figure 5A:
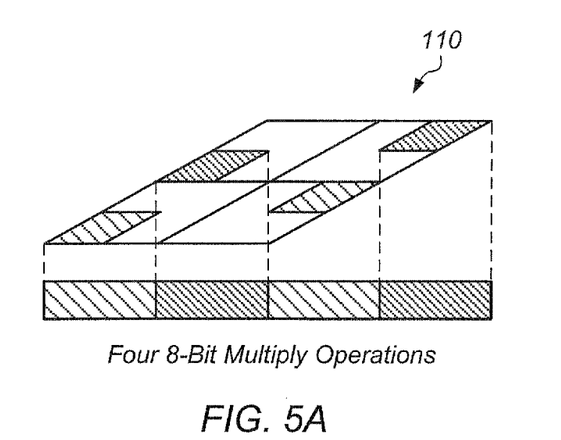
FIG. 5A is a block diagram of one embodiment of a multiplier partial product array.

Turning now to FIG. 5A, a block diagram of one embodiment of a multiplier partial product array is shown. The block diagram illustrates a parallelogram configuration for the adder trees of a multiplier. The routing of sum and carry terms between the various CSAs of the adder tree may allow for various different sizes of source operands to be multiplied in a multiplication operation. The shaded portions of partial product array 110 show which portions of the multiplier may be used for 8-bit integer or 8-bit polynomial multiplication. In one embodiment, array 110 may represent the adder tree of multiplier 70 (of FIG. 4). The shaded portions of array 110 depict which portions of the array may be used for the four separate 8-bit by 8-bit multiply operations. The shaded portions of array 110 are chosen so that the propagated carry and sum terms from the four separate multiply operations do not overlap or interfere with each other. In one embodiment, masks 72-78 (of FIG. 4) may mask portions of the input multiplicand and multiplier operands to zero, wherein the masked portions correspond to regions of the input operands that are not utilized for the four operations. As shown in FIG. 5A, four separate 8-bit by 8-bit multiply operations may be performed simultaneously using multiplier partial product array 110.

Figure 5B:
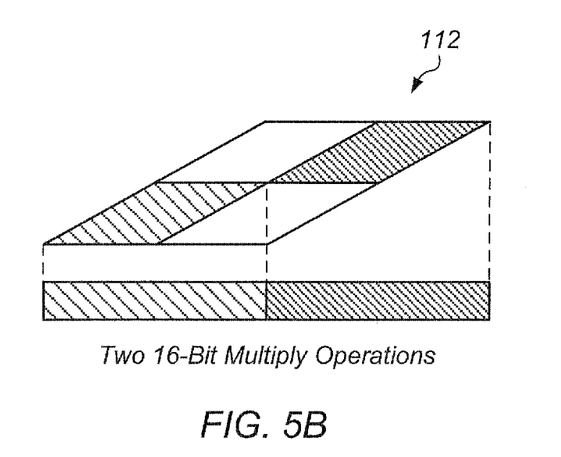
FIG. 5B is a block diagram of one embodiment of a multiplier partial product array.

Turning now to FIG. 5B, a block diagram of one embodiment of a multiplier partial product array is shown. The shaded portions of multiplier partial product array 112 depict which portions of multiplier 70 may be used for two separate 16-bit by 16-bit multiply operations. The shaded portions of array 112 are chosen so that the two separate multiply operations do not overlap.

Figure 5C:
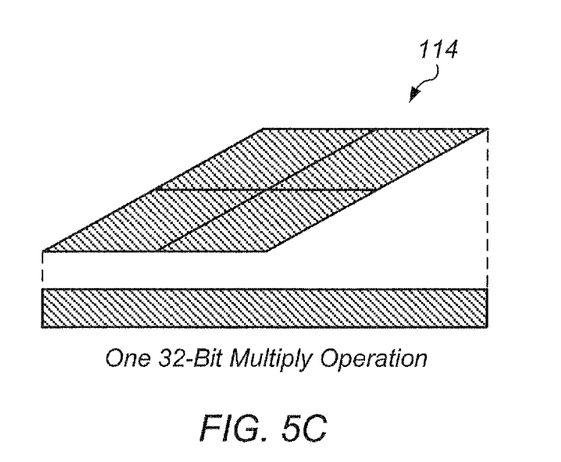
FIG. 5C is a block diagram of one embodiment of a multiplier partial product array.

Turning now to FIG. 5C, a block diagram of one embodiment of a multiplier partial product array is shown. The entirety of multiplier partial product array 114 may be used for performing a 32-bit by 32-bit multiply operation. In one embodiment, array 114 may correspond to the adder tree in multiplier 70.

Figure 6:
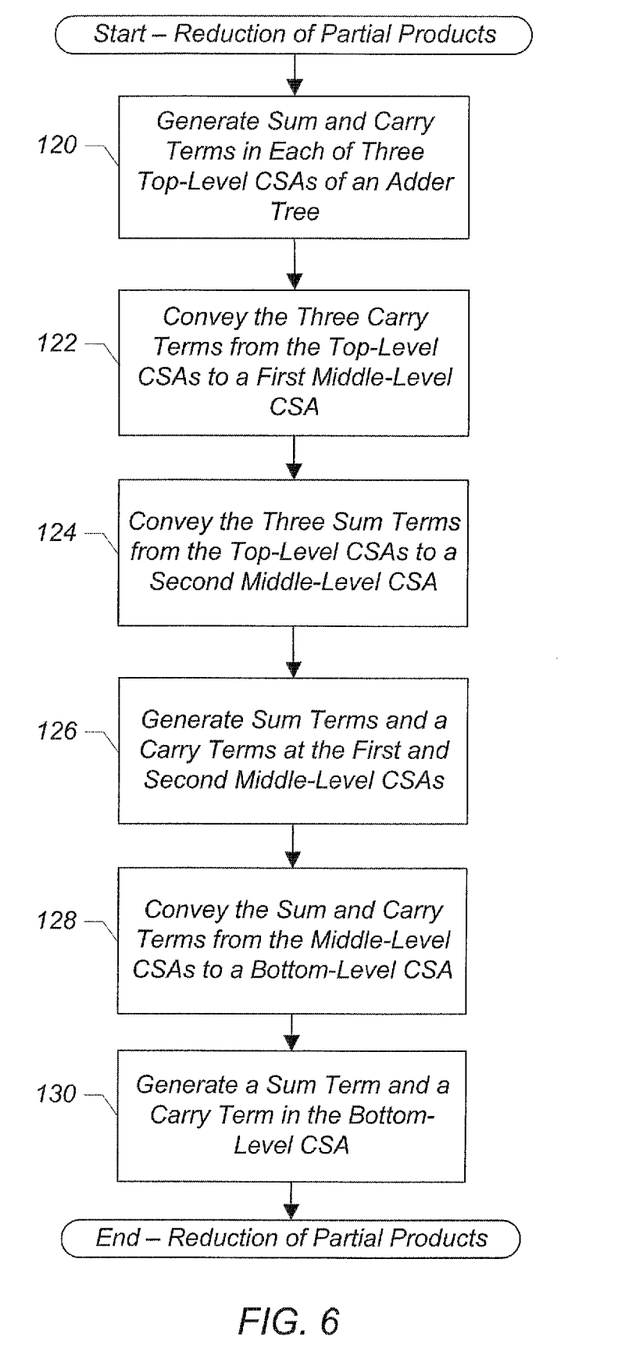
FIG. 6 is a generalized flow diagram illustrating one embodiment of a method for reducing partial products in a shared multiplier.

Turning now to FIG. 6, one embodiment of a method for reducing partial products in a shared multiplier is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a sum term and a carry term may be generated in each of three top-level CSAs of an adder tree (block 120). The top-level CSAs of the adder tree may receive a plurality of partial products generated from a multiplicand operand and based on a multiplier operand. The adder tree may include three levels, and the adder tree may be configured to add the partial products from input operands of varying widths. In one embodiment, the top-level CSAs may be 3:2 CSAs. In another embodiment, the top-level CSAs may be 4:2 CSAs. In a further embodiment, the top-level CSAs may be any of various other sizes of CSAs. In a still further embodiment, each of the top-level CSAs may be any of various sizes of CSAs. For example, a first top-level CSA may be a 2:2 CSA, a second top-level CSA may be a 3:2 CSA, and so on.

The three carry terms from the top-level CSAs may be conveyed to the inputs of a first middle-level CSA (block 122). The three sum terms from the top-level CSAs may be conveyed to the inputs of a second middle-level CSA (block 124). The first middle-level CSA may generate a sum term and a carry term from the three carry terms received from the top-level CSAs, and the second middle-level CSA may generate a sum term and a carry term from the three sum terms received from the top-level CSAs (block 126). In one embodiment, the middle-level CSAs may be 3:2 CSAs. In other embodiments, the middle-level CSAs may be any of various other sizes of CSAs. The sum term generated by the second middle-level CSA may be a polynomial product of the multiplicand operand and multiplier operand.

The sum and carry terms generated by the middle-level CSAs may be conveyed to a bottom-level CSA (block 128). In one embodiment, the bottom-level CSA may be a 4:2 CSA, although in other embodiments, the bottom-level CSA may be any of various other sizes of CSAs. The bottom-level CSA may generate a sum term and a carry term (block 130). The sum term and the carry term generated by the bottom-level CSA may represent an integer product of the multiplicand operand and the multiplier operand. In another embodiment, the sum term and the carry term may represent a floating point product of the multiplicand operand and the multiplier operand. In one embodiment, the sum term and the carry term may be added together in a single adder to generate a single term which represents the integer or floating point product. In another embodiment, the sum term and the carry term may be added together in a final adder tree along with other sum and carry terms from other adder trees.

Figure 7:
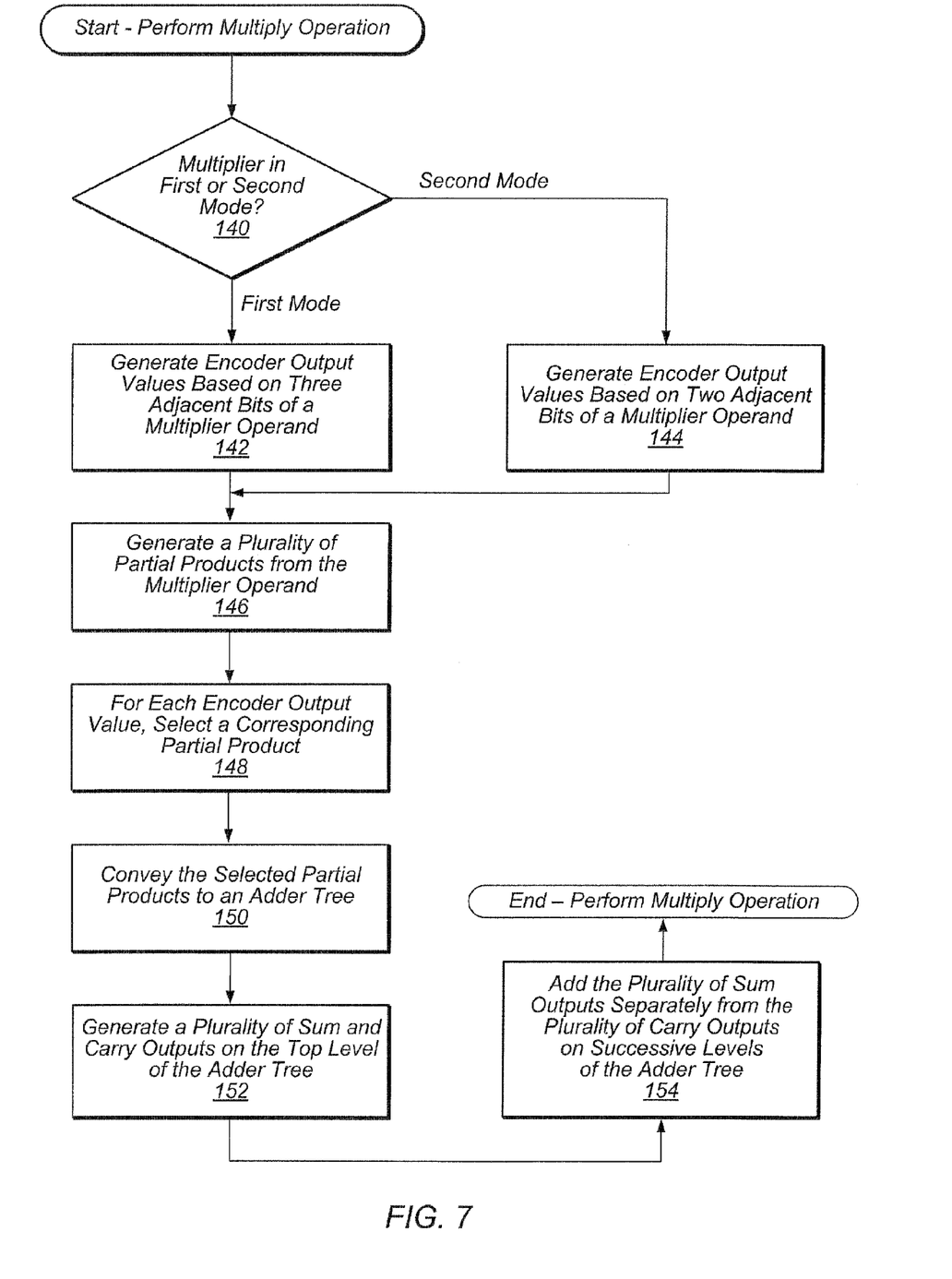
FIG. 7 is a generalized flow diagram illustrating one embodiment of a method for performing multiply operations in a shared multiplier.

Referring now to FIG. 7, one embodiment of a method for performing multiply operations in a shared multiplier is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

An encoder may determine whether the multiplier is in a first or second mode (block 140). If the multiplier is in a first mode, the encoder may generate encoder output values based on three adjacent bits of a multiplier operand (block 142). In one embodiment, the first mode may be an integer multiplication mode or a floating point multiplication mode. Furthermore, scalar or vector multiplication operation of integer or floating point operands may be performed in the first mode. The lowest bit of the three adjacent bits of the multiplier operand may overlap with the highest bit from the next group of three bits of the multiplier operand. In one embodiment, a multiplier may include a plurality of encoders, and each of the multiple encoders may generate a separate encoder output value. In various embodiments, the encoders may be referred to as booth encoders or modified booth encoders.

If the multiplier is in a second mode, then the encoder may generate encoder output values based on two adjacent bits of the multiplier operand (block 144). In one embodiment, the second mode may be a polynomial multiplication mode, and this mode may be utilized for either scalar or vector polynomial multiplication operations. A plurality of partial products may be generated from the multiplicand operand (block 146). The partial products may be shifted and/or negated versions of the multiplicand operand, representative of the different multiples of the multiplicand operand (0×, 1×, −1×, 2×, and −2× for the first mode and 0×, 1×, 2×, and polynomial 3× for the second mode). Then, for each encoder output value, a partial product may be selected from the plurality of partial products (block 148). In one embodiment, the partial products may be selected by one or more multiplexers. The multiplexers may be arranged in stages to facilitate efficient timing and routing of partial products to the next stage of the multiplier. The encoder output values may be coupled as select signals to the multiplexers.

The selected partial products may be conveyed to an adder tree (block 150). The adder tree may include a plurality of CSAs arranged into a plurality of levels. The adder tree may be configured to reduce the plurality of partial products on successive levels of the adder tree, such that at the bottom of the tree, one or two terms may remain that represent a sum of the plurality of partial products. The top level of the adder tree may generate a plurality of sum outputs and carry outputs (block 152). The adder tree may add the plurality of sum outputs separately from the plurality of carry outputs on successive levels (block 154). Sum and carry outputs may also be generated on lower levels of the adder tree, and these sum and carry outputs may also be routed separately through the adder tree.

At the bottom of the adder tree, the sum and carry outputs may be added together to generate an integer product of the multiplier and multiplicand operands. If the multiplier is in a first mode, the integer product may be generated and routed to an output or to another stage of the multiplier. A polynomial product may be generated by adding the plurality of sum outputs if the multiplier is in a second mode.

In one embodiment, the multiplier operand may include a plurality of multiplier values and the multiplicand operand may include a plurality of multiplicand values. In this embodiment, a vector multiply operation may be performed and a vector product may be generated by the multiplier. The multiplier may include a plurality of adder trees to add each of the individual values separately. The vector operation may be any of various types of vector operations, such as vector polynomial, vector integer, or vector floating point multiplication.

Figure 8:
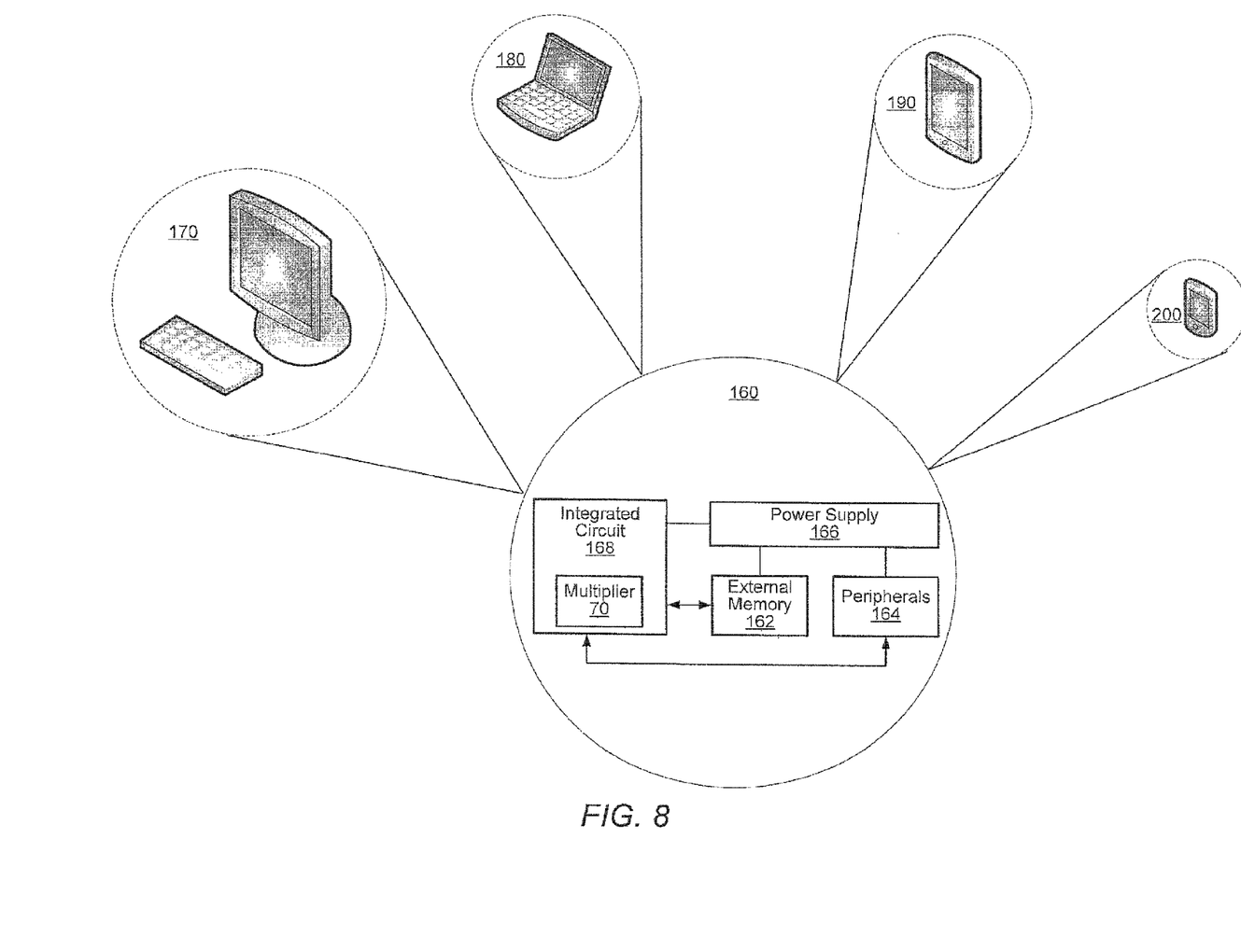
FIG. 8 is a block diagram of one embodiment of a system.

Turning next to FIG. 8, a block diagram of one embodiment of a system 160 is shown. As shown, system 160 may represent chip, circuitry, components, etc., of a desktop computer 170, laptop computer 180, tablet computer 190, cell phone 200, or otherwise. In the illustrated embodiment, the system 160 includes at least one instance of an integrated circuit 168 coupled to an external memory 162. Integrated circuit 168 may include one or more instances of multiplier 70. In another embodiment, integrated circuit 168 may include one or more instances of multiplier 10 (of FIG. 1).

The integrated circuit 168 is coupled to one or more peripherals 164 and the external memory 162. A power supply 166 is also provided which supplies the supply voltages to the integrated circuit 168 as well as one or more supply voltages to the memory 162 and/or the peripherals 164. In various embodiments, power supply 166 may represent a battery (e.g., a rechargeable battery in a smart phone, laptop or tablet computer). In some embodiments, more than one instance of the integrated circuit 168 may be included (and more than one external memory 162 may be included as well).

The memory 162 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 168 in a chip-on-chip configuration, a package-on-package configuration, or a multi-chip module configuration.

The peripherals 164 may include any desired circuitry, depending on the type of system 160. For example, in one embodiment, peripherals 164 may include devices for various types of wireless communication, such as wifi, Bluetooth, cellular, global positioning system, etc. The peripherals 164 may also include additional storage, including RAM storage, solid state storage, or disk storage. The peripherals 164 may include user interface devices such as a display screen, including touch display screens or multitouch display screens, keyboard or other input devices, microphones, speakers, etc.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A multiplier comprising:
a plurality of encoders, wherein each encoder of the plurality of encoders is configured to:
generate an encoder output value based on three bits from a multiplier operand when operating in a first mode; and
generate the encoder output value based on two bits from the multiplier operand and force a third bit of the multiplier operand to zero when operating in a second mode, wherein the two bits and the third bit are three distinct bits; and
an adder tree, wherein the adder tree comprises a plurality of carry save adders (CSAs) arranged into a plurality of levels, and wherein the adder tree is configured to:
couple the encoder output values to inputs of a top level of CSAs;
route carry terms to a first portion of CSAs and route sum terms to a second portion of CSAs;
generate a first output from the first and second portions of CSAs when operating in the first mode; and
generate a second output from the second portion of CSAs when operating in the second mode, wherein the second output is a polynomial product.

2. The multiplier as recited in claim 1, wherein the first output is an integer product and wherein the second output is a polynomial product.

3. The multiplier as recited in claim 1, wherein the first output is a floating point product and wherein the second output is a polynomial product.

4. The multiplier as recited in claim 1, wherein the multiplier further comprises a plurality of multiplexers for each encoder, wherein a multiplicand operand is coupled to a first input of a first multiplexer of the plurality of multiplexers, wherein a polynomial 3× term of the multiplicand operand is coupled to a second input of the first multiplexer, and wherein a polynomial select line is coupled to the first multiplexer.

5. The multiplier as recited in claim 1, wherein the first mode is an integer multiplication mode, and wherein the second mode is a polynomial multiplication mode.

6. An execution unit comprising four multipliers, wherein each multiplier comprises an adder tree and a plurality of encoders, wherein each adder tree comprises three levels of carry save adders (CSAs), wherein a top level comprises three CSAs, wherein a middle level comprises two CSAs, wherein a bottom level comprises one CSA, and wherein each adder tree is configured to:
couple output values from the plurality of encoders to inputs of the three CSAs on the top level;
couple carry outputs from the three CSAs on the top level to inputs of a first CSA on the middle level;
couple sum outputs from the three CSAs on the top level to inputs of a second CSA on the middle level;
wherein each encoder of the plurality of encoders is configured to:
generate an encoder output value based on three bits from a multiplier operand when operating in a first mode; and
generate the encoder output value based on two bits from the multiplier operand and force a third bit of the multiplier operand to zero when operating in a second mode, wherein the two bits and the third bit are three distinct bits,
wherein the second mode is a polynomial multiplication mode.

7. The execution unit as recited in claim 6, wherein each adder tree is configured to:
couple sum and carry outputs from the first and second CSAs on the middle level to inputs of a bottom level CSA, wherein the bottom level CSA is a 4:2 CSA; and
generate a sum output and a carry output from the bottom level CSA.

8. The execution unit as recited in claim 7, wherein each multiplier comprises a plurality of multiplexers for each encoder of the plurality of encoders, wherein a multiplicand operand is coupled to a first input of a first multiplexer of the plurality of multiplexers, wherein a polynomial 3× term of the multiplicand operand is coupled to a second input of the first multiplexer, and wherein a polynomial select line is coupled to the first multiplexer.

9. The execution unit as recited in claim 8, wherein the output result is a vector polynomial product.

10. The execution unit as recited in claim 9, wherein the vector polynomial product is generated from four pairs of 8-bit multiplicand and multiplier operands, and wherein the vector polynomial product comprises four separate 16-bit polynomial products packed into a single output operand.

11. The execution unit as recited in claim 7, further comprising eight output multiplexers, wherein sum and carry outputs from the bottom level CSA of each adder tree are coupled to two respective output multiplexers.

12. The execution unit as recited in claim 11, wherein a sum output from the bottom level CSA is coupled to a first output multiplexer, wherein a sum output from the second CSA on the middle level is coupled to the first output multiplexer, and wherein the carry output from the bottom level CSA is coupled to the second output multiplexer.

13. The execution unit as recited in claim 12, wherein the sum output from the second CSA on the middle level is a polynomial product.

14. The execution unit as recited in claim 12, wherein the execution unit is configured to:

select a sum output of the bottom level CSA as an output of the first output multiplexer responsive to operating in a first mode;

select the carry output of the bottom level CSA as an output of the second output multiplexer responsive to operating in the first mode;

select the sum output from the second CSA on the middle level as an output of the first output multiplexer responsive to operating in a second mode; and select zero as an output of the second output multiplexer responsive to operating in the second mode.

15. A method comprising:

generating a sum term and a carry term in each CSA of three top-level CSAs of an adder tree;

conveying the three carry terms to a first middle-level CSA of the adder tree;

conveying the three sum terms to a second middle-level CSA of the adder tree;

generating a sum term and a carry term in the first middle-level CSA;

generating a sum term and a carry term in the second middle-level CSA, wherein the sum term is a polynomial product of a multiplicand operand and a multiplier operand;

generating an encoder output value from each of a plurality of encoders based on three bits from a multiplier operand when operating in a first mode;

generating the encoder output value from each of the plurality of encoders based on two bits from the multiplier operand and forcing a third bit of the multiplier operand to zero when operating in a second mode, wherein the two bits and the third bit are three distinct bits, and conveying the encoder output values to inputs of the three top-level CSAs of the adder tree, wherein the second mode is a polynomial multiplication mode.

16. The method as recited in claim 15, further comprising:

conveying the sum and carry terms from the first and second middle-level CSAs to a bottom-level CSA; and generating a sum term and a carry term in the bottom-level CSA, wherein the sum and carry terms represent an integer product of the multiplicand operand and the multiplier operand.

17. The method as recited in claim 16, wherein a plurality of partial products are coupled to the three top-level CSAs of the adder tree, wherein the three sum terms and three carry terms of the three top-level CSAs are generated by adding the plurality of partial products, and wherein the plurality of partial products are generated from the multiplicand operand and the multiplier operand.

18. The method as recited in claim 15, further comprising:

coupling the multiplicand operand to a first input of a first multiplexer of a plurality of multiplexers for each encoder;

coupling a polynomial 3× term of the multiplicand operand to a second input of the first multiplexer; and coupling a polynomial select line to the first multiplexer.

19. A method comprising:

generating a plurality of encoder output values, wherein each encoder output value of the plurality of encoder output values is generated based on three adjacent bits of a multiplier operand responsive to a first mode being selected, and wherein each encoder output value is generated based on two adjacent bits of the multiplier operand and a third bit of the multiplier operand is forced to zero responsive to a second mode being selected, wherein the two adjacent bits and the third bit are three distinct bits;

generating a plurality of partial products from a multiplicand operand;

for each encoder output value, selecting a partial product from the plurality of partial products based on a respective encoder output value;

conveying the plurality of selected partial products to an adder tree;

generating a plurality of sum outputs and a plurality of carry outputs on a top level of the adder tree; and adding the plurality of sum outputs separately from the plurality of carry outputs on successive levels of the adder tree, generating a first output from the adder tree responsive to operating in the first mode; and generating a second output from the adder responsive to operating in the second mode, wherein the second output is a polynomial product.

20. The method as recited in claim 19, further comprising:

generating the first output as an integer product from the plurality of sum outputs and the plurality of carry outputs responsive to operating in the first mode; and generating the polynomial product from the plurality of sum outputs responsive to operating in the second mode.

21. The method as recited in claim 19, further comprising:

coupling the multiplicand operand to a first input of a first multiplexer of a plurality of multiplexers for each encoder;

coupling a polynomial 3× term of the multiplicand operand to a second input of the first multiplexer; and coupling a polynomial select line to the first multiplexer.

22. The method as recited in claim 19, further comprising receiving a multiplier operand and a multiplicand operand prior to generating the plurality of encoder output values, wherein the multiplier operand comprises a plurality of multiplier values, and wherein the multiplicand operand comprises a plurality of multiplicand values.

23. The method as recited in claim 22, further comprising:

generating a plurality of integer products from the plurality of sum outputs and the plurality of carry outputs responsive to operating in the first mode; and generating a plurality of polynomial products from the plurality of sum outputs responsive to operating in the second mode.

24. The method as recited in claim 19, wherein the adder tree comprises a plurality of carry save adders (CSAs) arranged into a plurality of levels, and wherein the adder tree is configured to reduce the plurality of partial products on successive levels of the adder tree.

* * * * *